(12) United States Patent
Lu et al.

(10) Patent No.: US 11,498,309 B2
(45) Date of Patent: Nov. 15, 2022

(54) MULTILAYER COMPOSITE RUBBER-PLASTIC FOAM INSULATION MATERIAL AND PREPARATION METHOD THEREOF

(71) Applicant: Durkee Hi-tech Material (Wuhan) Group Co., Ltd., Hubei (CN)

(72) Inventors: Biao Lu, Hubei (CN); Dongbao Peng, Hubei (CN); Jun Huang, Hubei (CN)

(73) Assignee: DURKEE HI-TECH MATERIAL (WUHAN) GROUP CO., LTD., Hubei (CN)

(*) Notice: Subject to any disclaimer, the term of this patent is extended or adjusted under 35 U.S.C. 154(b) by 501 days.

(21) Appl. No.: 16/499,836

(22) PCT Filed: Jun. 1, 2018

(86) PCT No.: PCT/CN2018/089667
§ 371 (c)(1),
(2) Date: Sep. 30, 2019

(87) PCT Pub. No.: WO2019/227489
PCT Pub. Date: Dec. 5, 2019

(65) Prior Publication Data
US 2021/0331442 A1    Oct. 28, 2021

(51) Int. Cl.
| | | |
|---|---|---|
| *B32B 5/20* | (2006.01) | |
| *B32B 7/027* | (2019.01) | |
| *B29C 48/00* | (2019.01) | |
| *B29C 48/21* | (2019.01) | |
| *B29C 44/34* | (2006.01) | |
| *B32B 5/32* | (2006.01) | |
| *B32B 25/14* | (2006.01) | |
| *C08J 9/00* | (2006.01) | |
| *C08J 9/10* | (2006.01) | |
| *B32B 38/00* | (2006.01) | |

(52) U.S. Cl.
CPC ............ *B32B 5/20* (2013.01); *B29C 44/3488* (2013.01); *B29C 48/0012* (2019.02); *B29C 48/022* (2019.02); *B29C 48/21* (2019.02); *B32B 5/32* (2013.01); *B32B 7/027* (2019.01); *B32B 25/14* (2013.01); *C08J 9/0061* (2013.01); *C08J 9/103* (2013.01); *B32B 2038/0076* (2013.01); *B32B 2250/22* (2013.01); *B32B 2307/304* (2013.01); *C08J 2203/04* (2013.01); *C08J 2307/00* (2013.01); *C08J 2309/00* (2013.01); *C08J 2309/02* (2013.01); *C08J 2323/16* (2013.01); *C08J 2327/06* (2013.01); *C08J 2409/00* (2013.01); *C08J 2431/04* (2013.01); *C08J 2471/12* (2013.01)

(58) Field of Classification Search
CPC ............... C08J 2427/06; C08J 2431/04; C08J 2471/12; C08J 9/0061; C08J 9/103; C08K 13/02; C08L 23/28; C08L 27/06; C08L 33/04; C08L 9/00; C08L 9/02; C08L 91/06
See application file for complete search history.

(56) References Cited

U.S. PATENT DOCUMENTS

| | | | | |
|---|---|---|---|---|
| 4,442,167 A | * | 4/1984 | Iwasa | B32B 27/20 428/323 |
| 6,221,451 B1 | * | 4/2001 | Lauer | B65D 39/0011 428/319.3 |
| 2006/0118997 A1 | * | 6/2006 | Gastaldi | B29C 33/405 264/225 |

FOREIGN PATENT DOCUMENTS

| | | | | |
|---|---|---|---|---|
| KR | 20130060440 A | * | 6/2013 | B32B 5/20 |

OTHER PUBLICATIONS

Translation of KE 20130060440A, Lee et al., Jun. 10, 2013. (Year: 2013).*

* cited by examiner

*Primary Examiner* — Hai Vo
(74) *Attorney, Agent, or Firm* — Chun-Ming Shih; Lanway IPR Services

(57) ABSTRACT

The present invention discloses a multilayer composite rubber-plastic foam insulation material and a preparation method thereof. The composite rubber-plastic foam insulation material includes a two-layer structure; the two-layer structure includes an insulation layer and a first functional layer; the insulation layer and the first functional layer are both made of a rubber-plastic foam material; the first functional layer and the insulation layer are integrally molded by blending extrusion and vulcanization foaming, and the first functional layer and the insulation layer form an integral structure. The multilayer composite rubber-plastic foam insulation material provided by the present invention adopts a vulcanization foaming integral molding process, and not only ensures the thermal insulation property of the insulation layer, but also gives the functional layer corresponding functions by selecting different functional polymers, thereby satisfying a variety of personalized needs in engineering applications.

6 Claims, 1 Drawing Sheet

MULTILAYER COMPOSITE RUBBER-PLASTIC FOAM INSULATION MATERIAL AND PREPARATION METHOD THEREOF

TECHNICAL FIELD

The present invention relates to the field of rubber-plastic foam insulation materials, and in particular, to a multilayer composite rubber-plastic foam insulation material and a preparation method thereof.

BACKGROUND

A traditional acrylonitrile butadiene rubber (NBR)/polyvinyl chloride (PVC) system rubber-plastic foam insulation material has been widely used in the fields such as thermal insulation of central air-conditioning systems and pipe systems. However, such traditional NBR/PVC system rubber-plastic foam insulation material is usually foamed in a single layer, and due to a rigid requirement for thermal insulation and fire resistance in the construction field, the single-formulation material has become more and more difficult to meet personalized needs of some specific projects, such as appearance color, cold resistance and high temperature resistance.

One method is to use a single functional rubber-plastic insulation material. Although it can have outstanding performance in some aspects, it has insufficient thermal insulation and fireproof performance. For example, Durkflex ®SLT has excellent performance in cold resistance but its fireproof performance is significantly insufficient (LOI=30, GB/T 2406, while building insulation requires LOI≥32).

The other common practice is to cover the surface of the thermal insulation material with a veneer (aluminum foil or glass fiber) by means of gluing, but this method has shortcomings that the process is complicated, the cost is high, and the veneer material affects the flexibility of rubber-plastic insulation material, resulting in difficult installation, etc.

SUMMARY

In view of the defects existing in the prior art, an object of the present invention is to provide a multilayer composite rubber-plastic foam insulation material integrally molded by blending extrusion and vulcanization foaming and a preparation method thereof.

In order to achieve the above object, the technical solution adopted by the present invention is: a multilayer composite rubber-plastic foam insulation material, wherein the composite rubber-plastic foam insulation material comprises a two-layer structure; the two-layer structure comprises an insulation layer and a first functional layer; the insulation layer and the first functional layer are both made of a rubber-plastic foam material; the first functional layer and the insulation layer are integrally molded by blending extrusion and vulcanization foaming, and the first functional layer and the insulation layer form an integral structure.

Further, the composite rubber-plastic foam insulation material is a plate or a pipe.

Further, the first functional layer comprises ACM, AEM, AU, EU, BR, BIIR, CIIR, ECO, EPM, EPDM, EVM, SBR, NBR, FKM, PM, IR, NR, PE, PP, PET, PBT, PC, PA, PU, PTFE and/or PMMA.

Further, the composite rubber-plastic foam insulation material comprises a second functional layer; the first functional layer and the second functional layer are respectively located on two sides of the insulation layer; the second functional layer is made of a rubber-plastic foam material, and the second functional layer and the insulation layer are integrally molded by blending extrusion and vulcanization foaming.

Further, the composite rubber-plastic foam insulation material is a plate or a pipe.

Further, the second functional layer comprises ACM, AEM, AU, EU, BR, BIIR, CIIR, ECO, EPM, EPDM, EVM, SBR, NBR, FKM, PM, IR, NR, PE, PP, PET, PBT, PC, PA, PU, PTFE and/or PMMA.

The present invention further provides a method for preparing the multilayer composite rubber-plastic foam insulation material, comprising the following steps:

uniformly mixing respective raw materials of an insulation layer and a first functional layer, and milling to obtain an insulation layer rubber sheet and a first functional layer rubber sheet which are not vulcanized and foamed;

blending and extruding the insulation layer rubber sheet and the first functional layer rubber sheet to obtain a semi-finished product in which the insulation layer and the first functional layer are integrally molded; and placing the semi-finished product in an oven for vulcanization foaming, and after the vulcanization foaming is completed, cooling for molding, thereby obtaining the multilayer composite rubber-plastic foam insulation material.

Further, the raw materials of the insulation layer comprise: NBR, PVC, a plasticizer, a foaming agent, a filler, a flame retardant, a promoter, and a vulcanizing agent;

the raw materials of the first functional layer comprise: NBR, a functional polymer, a plasticizer, a foaming agent, a filler, a flame retardant, a promoter, and a vulcanizing agent;

the NBR, the PVC, the plasticizer, the foaming agent, the filler and the flame retardant of the insulation layer are first mixed, then after cooling, the promoter and the vulcanizing agent are added, and the raw materials are uniformly mixed for milling to obtain a sheet;

the NBR, the functional polymer, the plasticizer, the foaming agent, the filler and the flame retardant of the first functional layer are first mixed, then after cooling, the promoter and the vulcanizing agent are added, and the raw materials are uniformly mixed for milling to obtain a sheet.

The present invention further provides a method for preparing the multilayer composite rubber-plastic foam insulation material, comprising the following steps:

uniformly mixing respective raw materials of an insulation layer, a first functional layer and a second first functional layer, and milling to obtain an insulation layer rubber sheet, a first functional layer rubber sheet and a second functional layer rubber sheet which are not vulcanized and foamed;

blending and extruding the insulation layer rubber sheet, the first functional layer rubber sheet and the second functional layer rubber sheet to obtain a semi-finished product in which the insulation layer, the first functional layer and the second functional layer are integrally molded; and placing the semi-finished product in an oven for vulcanization foaming, and after the vulcanization foaming is completed, cooling for molding, thereby obtaining the multilayer composite rubber-plastic foam insulation material.

Further, the raw materials of the insulation layer comprise: NBR, PVC, a plasticizer, a foaming agent, a filler, a flame retardant, a promoter, and a vulcanizing agent;

the raw materials of the first functional layer and the second functional layer both comprise: NBR, a functional polymer, a plasticizer, a foaming agent, a filler, a flame retardant, a promoter, and a vulcanizing agent;

the NBR, the PVC, the plasticizer, the foaming agent, the filler and the flame retardant of the insulation layer are first mixed, then after cooling, the promoter and the vulcanizing agent are added, and the raw materials are uniformly mixed for milling to obtain a sheet;

the NBR, the functional polymer, the plasticizer, the foaming agent, the filler and the flame retardant of the first functional layer are first mixed, then after cooling, the promoter and the vulcanizing agent are added, and the raw materials are uniformly mixed for milling to obtain a sheet;

the NBR, the functional polymer, the plasticizer, the foaming agent, the filler and the flame retardant of the second functional layer are first mixed, then after cooling, the promoter and the vulcanizing agent are added, and the raw materials are uniformly mixed for milling to obtain a sheet.

Compared with the prior art, the present invention has the following advantages:

The multilayer composite rubber-plastic foam insulation material provided by the present invention not only ensures the thermal insulation property of the insulation layer, but also gives the functional layer corresponding functions by selecting different functional polymers, thereby satisfying a variety of personalized needs in engineering applications, such as apparent color diversity, aging resistance, tear resistance, high temperature resistance, cold resistance, and mildew and bacterial resistance. Various functional veneers, such as aluminum foil, fiber cloth, paint and plastic film, are used to cover the surface of a material, but they have more or less disadvantages of a rigid material, so that the material is inconvenient to install and complicated in process. The multilayer composite rubber-plastic foam insulation material of the present invention has simple production process and integrated molding, and maintains the flexibility of the rubber-plastic foam material, that is, installation convenience. Relatively single functional rubber-plastic foam materials, such as Armafelx HT and Durkflex SLT, have outstanding performance in one aspect, but their overall performance is not good, their thermal conductivity or/and fireproof performance or/and water vapor permeability are lower than those of an ordinary NBR/PVC rubber-plastic foam material, and generally, they have a high production cost and a high selling price. It is well known that NBR/PVC is the most cost-effective rubber-plastic foam insulation material on the market, and the insulation layer of the multilayer composite rubber-plastic foam insulation material of the present invention is NBR/PVC, which can exert optimal insulation performance and special personalized performance, and make the production cost not high.

DETAILED DESCRIPTION

Figure 1:
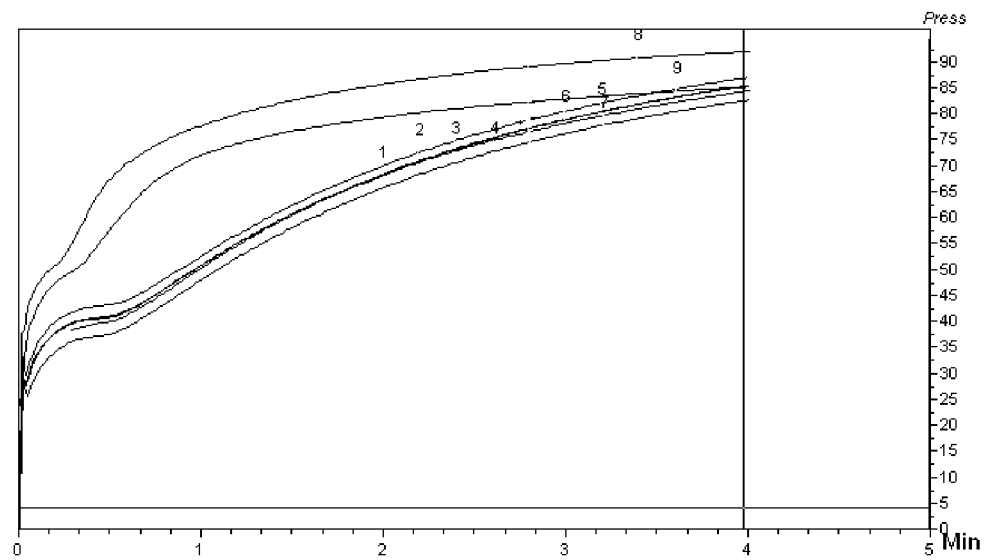
FIG. 1 is a foaming curve diagram of various layers of vulcanized rubber measured by a rotorless foaming vulcanization device (@170° C.×4 min) according to various examples and comparative examples of the present invention.

The present invention will be further described below in detail with reference to the drawings in combination with the embodiments.

An embodiment of the present invention provides a multilayer composite rubber-plastic foam insulation material, wherein the composite rubber-plastic foam insulation material includes a two-layer structure; the two-layer structure includes an insulation layer and a first functional layer; the insulation layer and the first functional layer are both made of a rubber-plastic foam material; the first functional layer and the insulation layer are integrally molded by blending extrusion and vulcanization foaming, and the first functional layer and the insulation layer form an integral structure.

The insulation layer and the first functional layer may be in the form of a flat plate or a cylindrical shape as needed during blending extrusion, so that the rubber-plastic foam insulation materials form an integrated plate or pipe.

The first functional layer includes ACM (Acrylate Rubber), AEM (Ethylene Acrylate Rubber), AU (Polyester Urethane), EU (Polyether Urethane), BR (Polybutadiene Rubber), BIIR (Brominated Isobutylene Isoprene Rubber), CIIR (Chlorinated Isobutylene Isoprene Rubber), ECO (Epichlorohydrin), EPM (Ethylene propylene Monomer), EPDM (Ethylene Propylene Diene Monomer), EVM (Ethylene vinyl acetate copolymer), SBR (Styrene Butadiene Rubber), NBR (Acrylonitrile Butadiene Rubber), FKM (fluoro rubber), PM, IR (Polyisoprene rubber), NR (Natural Rubber), PE (Polyethylene), PP (Polypropylene), PET (Polyethylene Terephthalate), PBT (Polybutylene Terephthalate), PC (Polycarbonate), PA (Polyamide), PU (Polyurethane), PTFE (Polytetrafluoroethylene) and/or PMMA (Polymethyl methacrylate)); the above raw materials can be combined and matched according to an actual functional need, to give the first functional layer corresponding functions, such as aging resistance, tear resistance, high temperature resistance, cold resistance, and mildew and bacterial resistance.

A pigment may be added to the first functional layer as needed, so that the first functional layer is colored to satisfy a personalized need for a color.

The composite rubber-plastic foam insulation material further includes a second functional layer; the first functional layer and the second functional layer are respectively located on two sides of the insulation layer; the second functional layer is made of a rubber-plastic foam material, and the second functional layer and the insulation layer are integrally molded by blending extrusion and vulcanization foaming.

The insulation layer, the first functional layer and the second functional layer may be in the form of a flat plate or a cylindrical shape as needed during blending extrusion, so that the rubber-plastic foam insulation materials form an integrated plate or pipe.

A pigment may be added to the second functional layer as needed, so that the second functional layer is colored to satisfy a personalized need for a color.

The second functional layer includes ACM, AEM, AU, EU, BR, BIIR, CIIR, ECO, EPM, EPDM, EVM, SBR, NBR, FKM, PM, IR, NR, PE, PP, PET, PBT, PC, PA, PU, PTFE and/or PMMA; the above raw materials can be combined and matched according to an actual functional need, to give the second functional layer corresponding functions, such as aging resistance, tear resistance, high temperature resistance, cold resistance, and mildew and bacterial resistance.

The present invention further provides a method for preparing the multilayer composite rubber-plastic foam insulation material, where an insulation layer includes: NBR, PVC (Polyvinyl Chloride), a plasticizer, a foaming agent, a filler, a flame retardant, a promoter, and a vulcanizing agent;

a first functional layer includes: NBR, a functional polymer, a plasticizer, a foaming agent, a filler, a flame retardant, a promoter, and a vulcanizing agent;

the preparation method includes the following steps:

mixing: uniformly mix respective raw materials of the insulation layer and the first functional layer at a mixing temperature of 130-160° C., cool to below 90° C., and mill to obtain an insulation layer rubber sheet and a first functional layer rubber sheet which are not vulcanized and foamed;

specifically, add the NBR, the PVC, the plasticizer, the foaming agent, the filler and the flame retardant of the insulation layer into an internal mixer for mixing to obtain a mixed compound of the insulation layer, discharge the mixed compound of the insulation layer to an open mill for mixing and cooling, add the promoter and the vulcanizing agent to the open mill, mix uniformly, and mill to obtain an insulation layer rubber sheet; and add the NBR, the functional polymer, the plasticizer, the foaming agent, the filler and the flame retardant of the first functional layer into an internal mixer for mixing to obtain a mixed compound of the first functional layer, discharge the mixed compound of the first functional layer to an open mill for mixing and cooling, add the promoter and the vulcanizing agent to the open mill, mix uniformly, and mill to obtain a first functional layer rubber sheet;

blending extrusion: respectively feed the insulation layer rubber sheet and the first functional layer rubber sheet into two extruders, and mix and extrude through the same double-layer composite die head to obtain a semi-finished product in which the insulation layer and the first functional layer are integrally molded, the extrusion temperature being 15-60° C., the temperature of the die head being 30-60° C., and the extrusion speed being 5-50 RPM/min; and vulcanization foaming: place the semi-finished product in an oven for vulcanization foaming, the temperature of the oven being 100-185° C. and the foaming time being 5-90 min, and after the vulcanization foaming is completed, take out and cool for molding to obtain the multilayer composite rubber-plastic foam insulation material, the insulation material being a double-layer insulation material.

The present invention further provides a method for preparing the multilayer composite rubber-plastic foam insulation material, where an insulation layer includes: NBR, PVC, a plasticizer, a foaming agent, a filler, a flame retardant, a promoter, and a vulcanizing agent;

a first functional layer and a second functional layer both include: NBR, a functional polymer, a plasticizer, a foaming agent, a filler, a flame retardant, a promoter, and a vulcanizing agent;

the preparation method includes the following steps:

mixing: uniformly mix respective raw materials of the insulation layer, the first functional layer and the second functional layer at a mixing temperature of 130-160° C., cool to below 90° C., and mill to obtain an insulation layer rubber sheet, a first functional layer rubber sheet and a second functional layer rubber sheet which are not vulcanized and foamed;

specifically, add the NBR, the PVC, the plasticizer, the foaming agent, the filler and the flame retardant of the insulation layer into an internal mixer for mixing to obtain a mixed compound of the insulation layer, discharge the mixed compound of the insulation layer to an open mill for mixing and cooling, add the promoter and the vulcanizing agent to the open mill, mix uniformly, and mill to obtain an insulation layer rubber sheet;

add the NBR, the functional polymer, the plasticizer, the foaming agent, the filler and the flame retardant of the first functional layer into an internal mixer for mixing to obtain a mixed compound of the first functional layer, discharge the mixed compound of the first functional layer to an open mill for mixing and cooling, add the promoter and the vulcanizing agent to the open mill, mix uniformly, and mill to obtain a first functional layer rubber sheet; and add the NBR, the functional polymer, the plasticizer, the foaming agent, the filler and the flame retardant of the second functional layer into an internal mixer for mixing to obtain a mixed compound of the second functional layer, discharge the mixed compound of the second functional layer to an open mill for mixing and cooling, add the promoter and the vulcanizing agent to the open mill, mix uniformly, and mill to obtain a second functional layer rubber sheet;

blending extrusion: respectively feed the insulation layer rubber sheet, the first functional layer rubber sheet and the second functional layer rubber sheet into three extruders, and mix and extrude through the same three-layer composite die head to obtain a semi-finished product in which the insulation layer, the first functional layer and the second functional layer are integrally molded, the extrusion temperature being 15-60° C., the temperature of the die head being 30-60° C., and the extrusion speed being 5-50 RPM/min; and vulcanization foaming: place the semi-finished product in an oven for vulcanization foaming, the temperature of the oven being 100-185° C. and the foaming time being 5-90 min, and after the vulcanization foaming is completed, take out and cool for molding to obtain the multilayer composite rubber-plastic foam insulation material, the insulation material being a three-layer insulation material.

The above insulation layer adopts a traditional NBR/PVC rubber-plastic blending and vulcanization foaming formulation system, which is a common formulation of rubber-plastic foam materials using NBR/PVC as a base material and meeting GB/T17794.

The above functional polymer may include, but not limited to all types of polymers such as ACM, AEM, AU, EU, BR, BIIR, CIIR, ECO, EPM, EPDM, EVM, SBR, NBR, FKM, PM, IR, NR, PE, PP, PET, PBT, PC, PA, PU, PTFE, and PMMA. The above raw materials can be combined and matched according to an actual functional need, to give the first functional layer corresponding functions, such as aging resistance, tear resistance, high temperature resistance, cold resistance, and mildew and bacterial resistance.

The NBR in the first functional layer and the second functional layer functions as a compatibilizer therein, and achieves a positive effect on simultaneous vulcanization of vulcanization systems of the insulation layer and the first functional layer or the insulation layer, the first functional layer and the second functional layer, thereby ensuring integral foaming molding of the multilayer composite.

The present invention has an essential difference from a non-foamed rubber-plastic multilayer composite material. For the multilayer blended and foamed material, different components are required to be synergistically foamed and integrally molded, that is, the foaming speed of different components is required to be consistent; the degree of cross-linking vulcanization of the foam material must be balanced with the foaming speed to produce a product with low density, low thermal conductivity and high resistance to water vapor permeation; therefore, the foaming speed and the degree of cross-linking of different components must be ensured to be consistent during the molding process. If different components adopt the same foaming vulcanization system, the problem of matching the foaming speed with the degree of cross-linking can be solved.

The plasticizer is a phosphate/phosphate ester plasticizer, paraffin oil and a chlorinated plasticizer or a mixture thereof, specifically one or a mixture of more than one of chlorinated paraffin, tricresyl phosphate, dioctyl-phthalate (DOP), diisononyl phthalate (DINP) and paraffin oil;

the foaming agent may include at least one chemical foaming agent of an organic foaming agent and/or an inorganic foaming agent, specifically, azodicarbonamide;

the filler is carbon black, white carbon black, an aluminum compound, a mineral-based material and a silicon-based compound, or a mixture thereof, or one or a mixture of more than one of carbon black, white carbon black, aluminum hydroxide, talcum powder, argil and calcium carbonate;

the flame retardant is a compound including one or more of boron, aluminum, antimony, phosphorus, halogen, molybdenum, copper and nitrogen, or one or a mixture of more than one of aluminum hydroxide, magnesium hydroxide, molybdenum oxide, ammonium octamolybdate, antimonous oxide and zinc borate.

A pigment may also be added to the above functional layer to give different colors to the functional layer; the pigment may be an inorganic pigment or/and an organic pigment, which is one or a mixture of more than one of phthalocyanine blue, rubber red, rubber green, titanium dioxide and carbon black.

The present invention is described in detail below with reference to 5 examples and 2 comparative examples.

The insulation layers of the respective examples and comparative examples described below are the same. Among the 5 examples, Example 4 adopts the above preparation method of the three-layer insulation material, and the other four examples and the comparative examples adopt the above preparation method of the double-layer insulation material. The formulations of the respective embodiments and comparative examples are shown in Table 1 below.

TABLE 1

Formulations of Examples 1 to 5 and Comparative Examples 1 to 2

|  | Insulation layer (%) | Example 1 First functional layer (%) | Example 2 First functional layer (%) | Example 3 First functional layer (%) | Example 4 First functional layer (%) | Example 4 Second functional layer (%) | Example 5 First functional layer (%) | Comparative Example 1 First functional layer (%) | Comparative Example 2 First functional layer (%) |
|---|---|---|---|---|---|---|---|---|---|
| NBR | 15 |  | 3 | 6 | 8 | 5 | 4 |  |  |
| PVC | 12 | 10 | 3 |  |  |  |  |  |  |
| Functional polymer |  | 16 | 30 | 25 | 22 | 28 | 35 | 30 | 35 |
| AC foaming agent | 14 | 10 | 11 | 12 | 10 | 7 | 10 | 13 | 8 |
| Carbon black | 5 |  |  |  |  |  |  | 1 |  |
| Titanium dioxide |  | 4.5 | 2 | 3.5 | 4.5 | 4.5 | 5 |  | 5 |
| Aluminum hydroxide | 21 | 15 | 20 | 21 | 21 | 18 | 22 | 22 | 21 |
| Argil | 5 | 4 |  |  |  | 5 |  | 5 | 4 |
| Calcium carbonate | 5 | 4 |  |  | 3 |  |  | 3 |  |
| Zinc borate | 2 | 5 | 3 | 5 | 4 | 2 | 2 | 2 | 4 |
| Antimonous oxide | 4 | 7 | 7 | 8 | 8 | 8 | 5 | 5 | 6.5 |
| Chlorinated paraffin | 17 | 24 | 13 | 12 | 12 | 13 |  | 19 | 16 |
| DINP |  |  | 7 |  |  |  | 3 |  |  |
| Rubber paraffin oil |  |  |  | 7 | 7 | 9 |  |  |  |
| Dioctyl sebacate (DOS) |  |  |  |  |  |  | 13 |  |  |
| Phthalocyanine green |  |  | 1 |  |  |  | 1 |  |  |
| Rubber red |  | 0.5 |  | 0.5 | 0.5 | 0.5 |  |  | 0.5 |

In Table 1, the raw materials of the insulation layer, the first functional layer and the second functional layer are all calculated by weight percentage in the examples, and are also calculated by weight percentage in the comparative examples.

The ratios of the functional polymer in the respective examples and comparative examples are shown in Table 2 below.

TABLE 2

Ratios of functional polymer

|  | Example 1 | Example 2 | Example 3 | Example 4 | Example 5 | Comparative Example 1 | Comparative Example 2 |
|---|---|---|---|---|---|---|---|
| NBR | 80% |  |  |  |  |  |  |
| BR | 10% | 25% | 10% | 5% | 45% |  | 15% |
| NR |  | 60% |  |  |  | 70% |  |
| EPDM |  |  | 60% | 70% | 30% |  | 65% |
| POE |  |  |  | 30% | 20% |  |  |
| EVA | 10% | 15% | 25% |  |  | 30% | 20% |

The examples and the comparative examples are sampled respectively after a mixing process is completed and mixed rubber sheets are obtained, and vulcanization curves and foaming curves are made by using a rotorless foaming vulcanization device.

Figure 2:
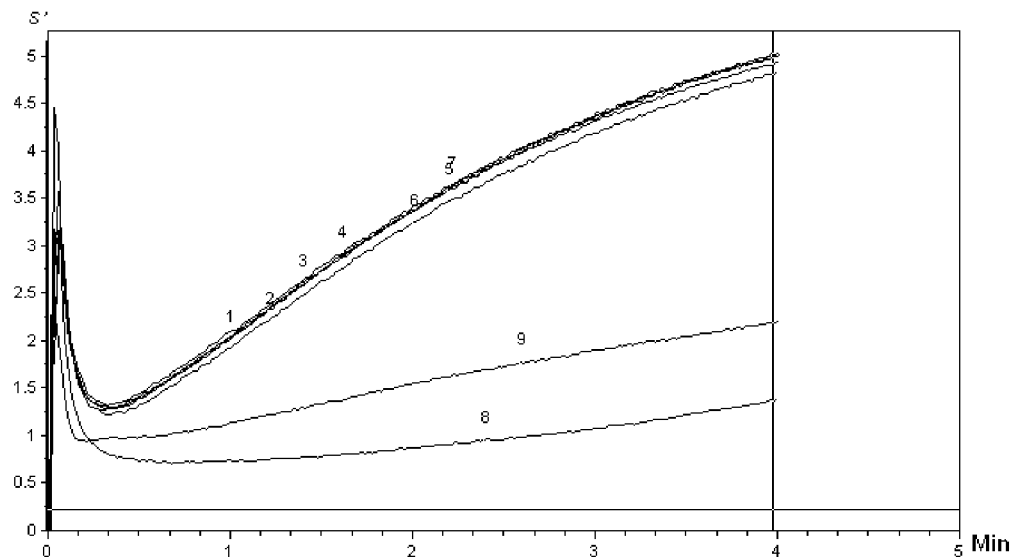
FIG. 2 is a vulcanization curve diagram of various layers of vulcanized rubber measured by a rotorless foaming vulcanization device (@170° C.×4 min) according to various examples and comparative examples of the present invention.

FIG. 1 and FIG. 2 show the foaming curves and the vulcanization curves in 4 min at 170° C., respectively. It can be seen from FIG. 1, curves 1 to 7 are very close, indicating that the functional layers and corresponding insulation layers of Examples 1 to 5 have the same foaming speed. It can be seen from FIG. 2 that the curves 1 to 7 are very close, indicating that the functional layers and the corresponding insulation layers of Examples 1 to 5 have the same vulcanization speed. Therefore, the preparation method of the present invention realizes the same vulcanization and foaming speed of the functional layers and the corresponding insulation layers, and can realize simultaneous vulcanization and foaming molding. The vulcanization curves and the foaming curves of Comparative Example 1 to 2 show a large difference between the functional layers and the corresponding insulation layers, indicating that it is difficult to achieve simultaneous vulcanization and foaming during a molding process. Combined with the test results of Table 3, it is further verified that Examples 1 to 5 can prepare an integrally-molded composite rubber-rubber foam insulation material, and the Comparative Example 1 to 2 fail in the preparation of the composite material due to delamination and tear in a vulcanization foaming process.

TABLE 3

Performance characteristics of examples and comparative examples

| | Material | Performance characteristic |
|---|---|---|
| Example 1 | Double-layer composite | The first functional layer is red, and the main body of the material is black. |
| Example 2 | Double-layer composite | The first functional layer is green, and the material is tear resistant. |
| Example 3 | Double-layer composite | The first functional layer is red, and the material is resistant to aging and high temperature. |
| Example 4 | Three-layer composite | The first and the second functional layers are red, and the material is resistant to aging and high temperature. |
| Example 5 | Double-layer composite | The first functional layer is green, and the material is resistant to cold and low temperature. |
| Comparative Example 1 | Delaminated, not composited | The first functional layer is gray. |
| Comparative Example 2 | Delaminated, not composited | The first functional layer is red. |
| Comparative Example 3 | Armafelx HT | The material is resistant to high temperature, and is applied for pipeline insulation below 125° C. |
| Comparative Example 4 | Durkflex SLT | The material is applied for deep cold-heat insulation. |

The above Comparative Example 3 and Comparative Example 4 are commercially available single-layer rubber-plastic foam insulation products.

Referring to Tables 1 and 2, in Example 2, NR is added as a main skeleton material; the natural rubber NR is crystalline rubber, which has a strong self-reinforcing property and good mechanical strength, elasticity, and flexing resistance, and can provide sufficient tear resistance for the composite; in addition, an appropriate amount of NBR and PVC is blended in the first functional layer to adopt a synergistic cross-linked foaming system to control the integral foaming molding of the composite material in a double-component blending extrusion and foaming process. Therefore, in Table 3, Example 2 is shown to be tear resistant.

Similarly, in Examples 3 and 4, EPDM (ethylene propylene diene monomer) is added as a main skeleton material; a main chain of the monomer is composed of chemically stable saturated hydrocarbons, so the monomer has excellent aging resistance such as ozone resistance, heat resistance and weather resistance; in addition, an appropriate amount of NBR is blended in the functional layer to adopt a synergistic cross-linked foaming system to control the integral foaming molding of the composite material in a blending extrusion and foaming process. Therefore, in Table 3, Examples 3 and 4 are shown to be aging resistant.

TABLE 4

Comprehensive performance test results of examples and comparative examples

| Item | Unit | Example 1 | Example 2 | Example 3 | Example 4 | Example 5 | Comparative Example 3 | Comparative Example 4 |
|---|---|---|---|---|---|---|---|---|
| Density | kg/m$^3$ | 48 | 50 | 49 | 54 | 52 | 65 | 68 |
| Thermal conductivity | W/m · k, 0° C. | 0.034 | 0.034 | 0.033 | 0.036 | 0.035 | 0.040 | 0.039 |
| Humidity resistance factor | | 9000 | 8000 | 8500 | 10000 | 9000 | 3000 | 2500 |
| Combustion performance | | Grade C | Grade C | Grade C | Grade C | Grade C | Grade D | Grade D |
| Water absorption in vacuum | % | 4 | 5 | 4 | 3 | 4 | 8 | 7 |
| Operating temperature range | ° C. | −40 to 105 | −40 to 105 | −50 to 125 | −50 to 125 | −40 to 105 | −110 to 125 | −196 to 105 |

The parameters in Table 4 are tested based on the conditions of a rubber-plastic foam insulation material performance test in GB/T17794-2008.

TABLE 5

Performance test results of functional layers of embodiments

| | Tensile Strength (MPa) | Elongation at Break (%) | Tear Strength (N/cm) | Xenon-resistant Lamp Aging Performance | Operating Temperature Range |
|---|---|---|---|---|---|
| Detection method | GB/T6344 | | GB/T10808 | GB/T16259 | |
| Example 1 | 0.25 | 120 | 2.6 | Slightly wrinkled, with a pinhole | −40 to 105° C. |
| Example 2 | 0.43 | 180 | 4.2 | Slightly wrinkled, with a pinhole | −40 to 105° C. |
| Example 3 | 0.26 | 125 | 2.5 | No pinhole, no crack | −50 to 125° C. |
| Example 4 | 0.27 | 130 | 2.7 | No pinhole, no crack | −50 to 125° C. |
| Example 5 | 0.28 | 135 | 2.6 | Slightly wrinkled, no pinhole | −100 to 125° C. |
| Comparative Example 3 | 0.18 | 120 | 2.4 | Undetected | −40 to 125° C. |
| Comparative Example 4 | 0.25 | 140 | 2.8 | Undetected | −196 to 105° C. |

It can be seen from Tables 3 to 5 above, the composite rubber-plastic foam insulation material prepared by the present invention has a flexible characteristic of integral foaming molding, and thus maintains the thermal insulation, sound insulation, economy and easy installation performance of a traditional flexible insulation material, and has an outstanding advantage that through the innovative design of the functional layer, it can achieve different performance requirements to meet personalized needs of various thermal insulation projects.

Compared with a traditional single NBR/PVC system rubber-plastic foam insulation material, the multilayer composite rubber-plastic foam insulation material prepared by the preparation method provided by the present invention not only ensures the thermal insulation property of the insulation layer, but also gives the functional layer corresponding functions by selecting different functional polymers, thereby satisfying a variety of personalized needs in engineering applications, such as apparent color diversity, aging resistance, tear resistance, high temperature resistance, cold resistance, and mildew and bacterial resistance. Various functional veneers, such as aluminum foil, fiber cloth, paint and plastic film, are used to cover the surface of a material, but they have more or less disadvantages of a rigid material, so that the material is inconvenient to install and complicated in process. The multilayer composite rubber-plastic foam insulation material of the present invention has simple production process and integrated molding, and maintains the flexibility of the rubber-plastic foam material, that is, installation convenience. Relatively single functional rubber-plastic foam materials, such as Armafelx HT and Durkflex SLT, have outstanding performance in one aspect, but their overall performance is not good, their thermal conductivity or/and fire performance or/and water vapor permeability are lower than those of an ordinary NBR/PVC rubber-plastic foam material, and generally, they have a high production cost and a high selling price. It is well known that NBR/PVC is the most cost-effective rubber-plastic foam insulation material on the market, and the insulation layer of the multilayer composite rubber-plastic foam insulation material of the present invention is NBR/PVC, which can exert optimal insulation performance and special personalized performance, and make the production cost not high.

The present invention is not limited to the above implementations. For a person of ordinary skill in the art, several improvements and modifications may further be made without departing from the principle of the present invention, but the improvements and modifications should also be considered to fall within the protection scope of the present invention. Those not described in detail in the present specification belong to the prior art well known to those skilled in the art.

The invention claimed is:

1. A multilayer composite rubber-plastic foam insulation material, wherein the composite rubber-plastic foam insulation material comprises a two-layer structure; the two-layer structure comprises an insulation layer and a first functional layer; the insulation layer and the first functional layer are both made of a rubber-plastic foam material; the first functional layer and the insulation layer are integrally molded by blending extrusion and vulcanization foaming, and the first functional layer and the insulation layer form an integral structure;
    wherein raw materials of the insulation layer comprise: NBR, PVC, a plasticizer, a foaming agent, a filler, a flame retardant, a promoter, and a vulcanizing agent;
    wherein raw materials of the first functional layer comprise: NBR, a functional polymer, a plasticizer, a foaming agent, a filler, a flame retardant, a promoter, and a vulcanizing agent; and
    wherein the first functional layer contains 3-8% by weight of the NBR based on the weight of the first function layer, and the insulation layer contains 15% by weight of the NBR based on the weight of the insulation layer.

2. The multilayer composite rubber-plastic foam insulation material according to claim 1, wherein the composite rubber-plastic foam insulation material is a plate or a pipe.

3. A preparation method of the multilayer composite rubber-plastic foam insulation material according to claim 1, comprising the following steps:

uniformly mixing respective raw materials of an insulation layer and a first functional layer, and milling to obtain an insulation layer rubber sheet and a first functional layer rubber sheet which are not vulcanized and foamed;

blending and extruding the insulation layer rubber sheet and the first functional layer rubber sheet to obtain a semi-finished product in which the insulation layer and the first functional layer are integrally molded; and placing the semi-finished product in an oven for vulcanization foaming, and after the vulcanization foaming is completed, cooling for molding, thereby obtaining the multilayer composite rubber-plastic foam insulation material;

wherein the NBR, the PVC, the plasticizer, the foaming agent, the filler and the flame retardant of the insulation layer are first mixed, then after cooling, the promoter and the vulcanizing agent are added, and the raw materials are uniformly mixed for milling to obtain an insulation layer rubber sheet;

wherein the NBR, the functional polymer, the plasticizer, the foaming agent, the filler and the flame retardant of the first functional layer are first mixed, then after cooling, the promoter and the vulcanizing agent are added, and the raw materials are uniformly mixed for milling to obtain a first functional layer rubber sheet; and wherein the first functional layer contains 3-8% by weight of the NBR based on the weight of the first function layer, and the insulation layer contains 15% by weight of the NBR based on the weight of the insulation layer.

4. The multilayer composite rubber-plastic foam insulation material according to claim 1, wherein the composite rubber-plastic foam insulation material further comprises a second functional layer; the first functional layer and the second functional layer are respectively located on two sides of the insulation layer; the second functional layer is made of a rubber-plastic foam material, and the second functional layer and the insulation layer are integrally molded by blending extrusion and vulcanization foaming;

wherein raw materials of the second functional layer comprise: NBR, a functional polymer, a plasticizer, a foaming agent, a filler, a flame retardant, a promoter, and a vulcanizing agent.

5. The multilayer composite rubber-plastic foam insulation material according to claim 4, wherein the composite rubber-plastic foam insulation material is a plate or a pipe.

6. A preparation method of the multilayer composite rubber-plastic foam insulation material according to claim 4, comprising the following steps:

uniformly mixing respective raw materials of an insulation layer, a first functional layer and a second first functional layer, and milling to obtain an insulation layer rubber sheet, a first functional layer rubber sheet and a second functional layer rubber sheet which are not vulcanized and foamed;

blending and extruding the insulation layer rubber sheet, the first functional layer rubber sheet and the second functional layer rubber sheet to obtain a semi-finished product in which the insulation layer, the first functional layer and the second functional layer are integrally molded; and placing the semi-finished product in an oven for vulcanization foaming, and after the vulcanization foaming is completed, cooling for molding, thereby obtaining the multilayer composite rubber-plastic foam insulation material;

wherein the NBR, the PVC, the plasticizer, the foaming agent, the filler and the flame retardant of the insulation layer are first mixed, then after cooling, the promoter and the vulcanizing agent are added, and the raw materials are uniformly mixed for milling to obtain an insulation layer rubber sheet;

wherein the NBR, the functional polymer, the plasticizer, the foaming agent, the filler and the flame retardant of the first functional layer are first mixed, then after cooling, the promoter and the vulcanizing agent are added, and the raw materials are uniformly mixed for milling to obtain a first functional layer rubber sheet;

wherein the NBR, the functional polymer, the plasticizer, the foaming agent, the filler and the flame retardant of the second functional layer are first mixed, then after cooling, the promoter and the vulcanizing agent are added, and the raw materials are uniformly mixed for milling to obtain a second functional rubber sheet; and wherein the first functional layer contains 3-8% by weight of the NBR based on the weight of the first function layer, and the insulation layer contains 15% by weight of the NBR based on the weight of the insulation layer.

* * * * *